United States Patent Office 3,393,606
Patented July 23, 1968

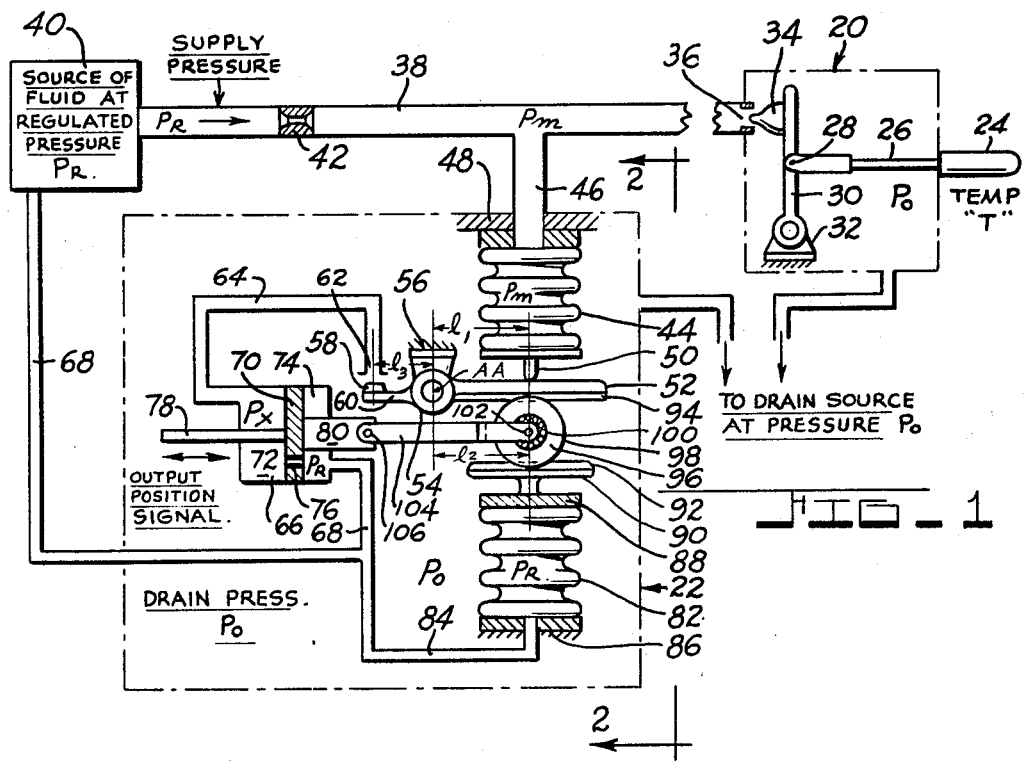
FIG_1
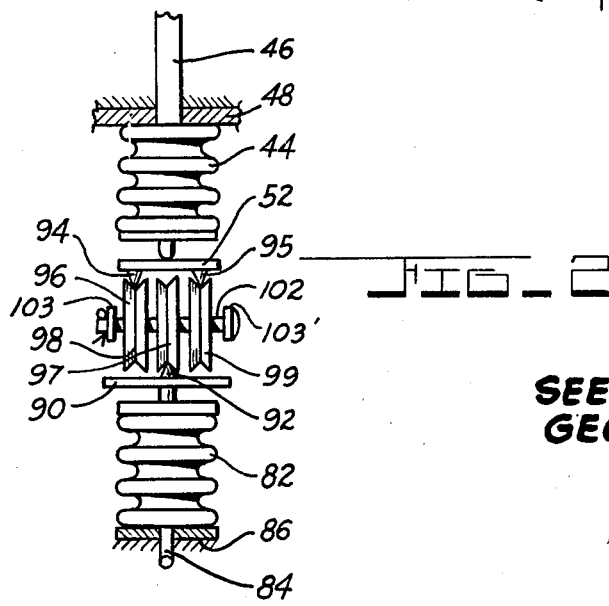
FIG_2
SEELEY L. MAGNANI.
GEORGE H. FLAKE.
INVENTORS.

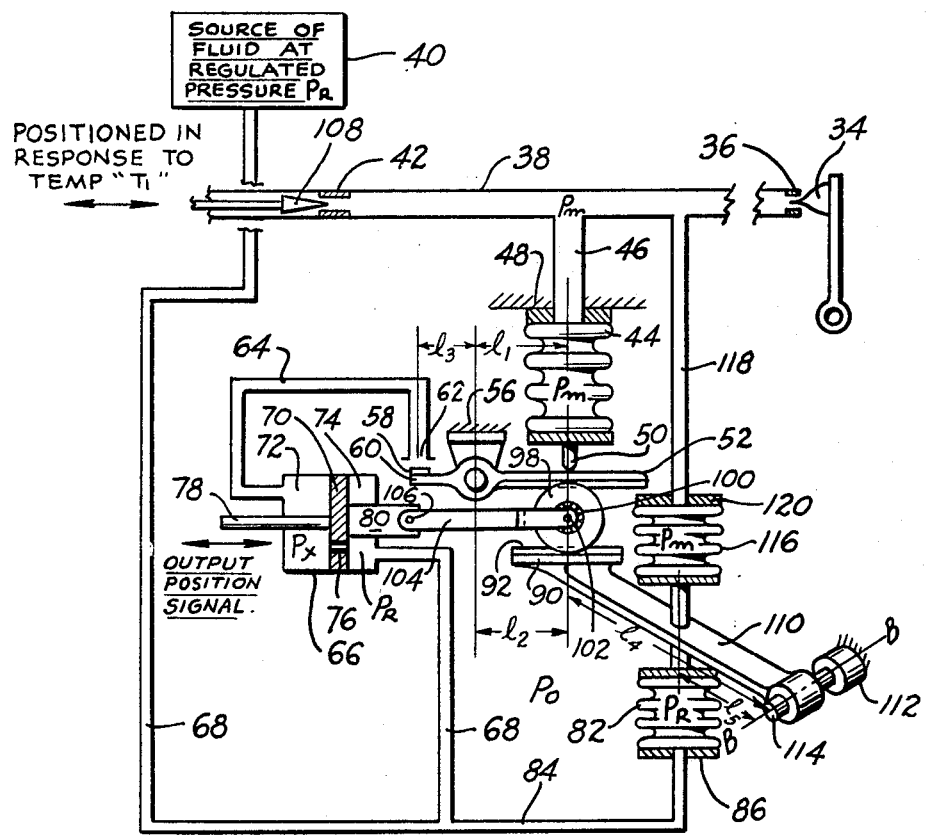

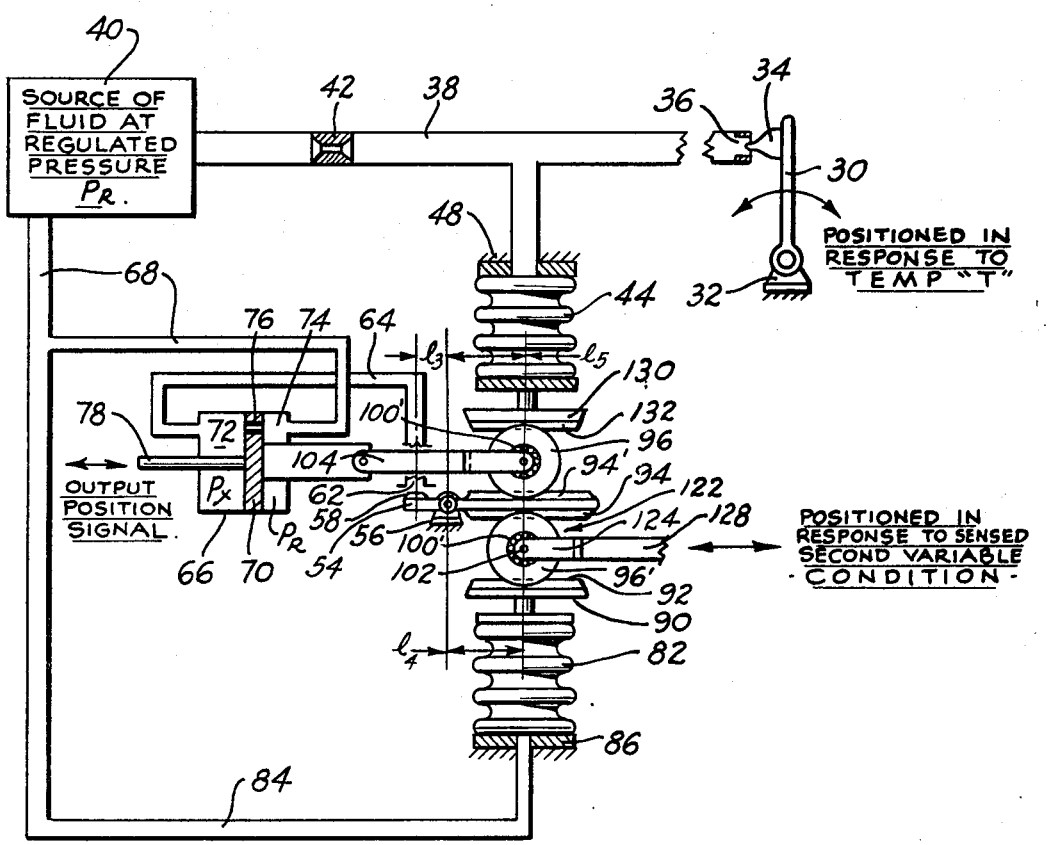

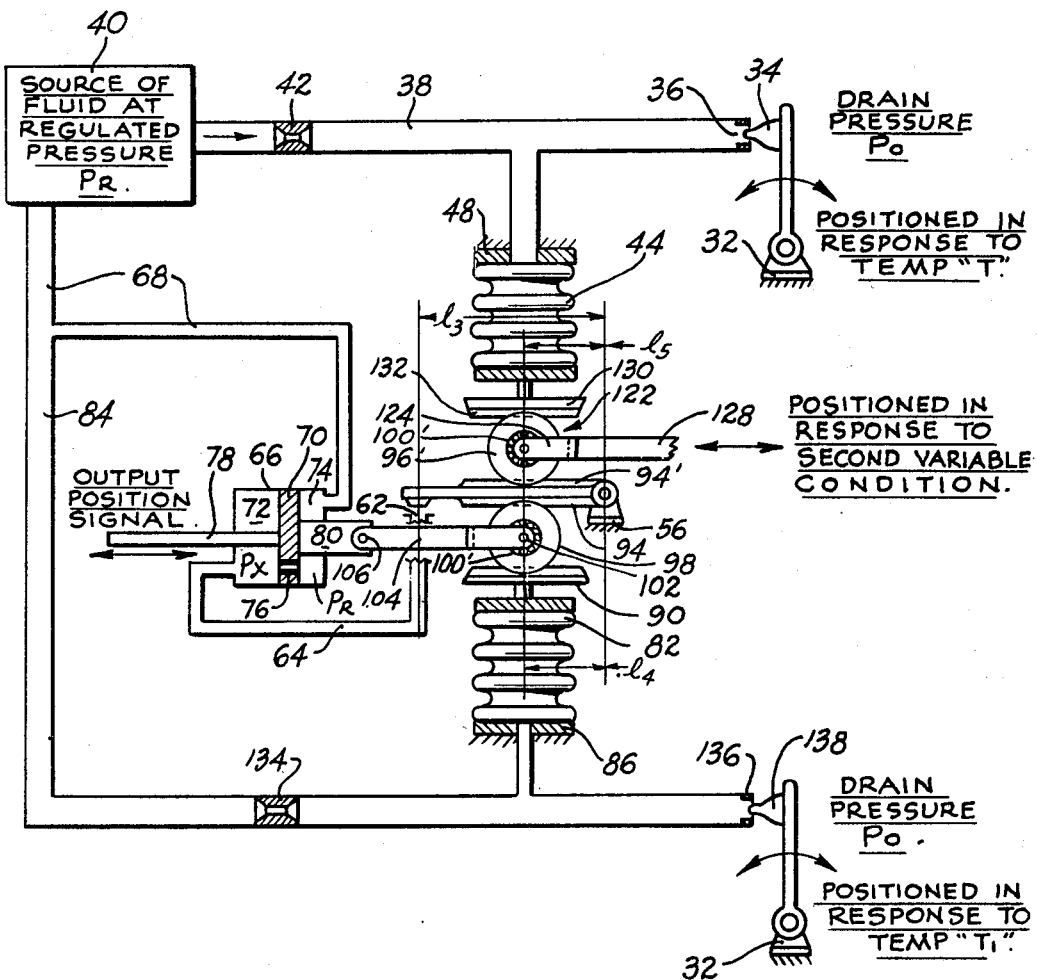

3,393,606
MOTION TRANSMITTING MECHANISM HAVING FLUID PRESSURE BALANCING MEANS
Seeley L. Magnani and George H. Flake, South Bend, Ind., assignors to The Bendix Corporation, a corporation of Delaware
Filed Sept. 30, 1966, Ser. No. 583,194
10 Claims. (Cl. 91—47)

This invention relates to motion transmitting devices wherein an input mechanical motion is converted to an output mechanical motion via a controlled pressure fluid circuit and, in particular, relates to a fluid servo actuating device wherein the fluid servo pressure is controlled by a remotely located positionable sensor responsive to a condition of operation.

The present invention is an improvement over the motion transmitting system described and claimed in U.S. Patent No. 3,171,330 issued Mar. 2, 1965, in the name of H. L. McCombs, Jr. (common assignee). The present invention accomplishes the result of the device of Patent No. 3,171,330, but with significantly less structure which reduces complexity, cost, weight, size and increases reliability accordingly without sacrificing accuracy of operation. For example, the present invention utilizes one force balance network which forms part of a pressure receiver whereas the device of Patent No. 3,171,330 requires two force balance networks, one for each of the pressure transmitter and receiver units required therein. Also, no springs are required in the present invention which eliminates the necessity of providing for temperature compensation of the same.

It is an object of the present invention to provide a motion transmitting device capable of transferring input motion from a remotely located condition sensor to a fluid servo pressure operated actuator capable of producing an output motion via a controlled fluid servo pressure with accuracy and reliability.

It is another object of the present invention to provide a motion transmitting device including a fluid pressure actuated output portion and a remotely located condition sensor input portion for controlling the fluid pressure to which the actuator responds wherein the output movement of the actuator bears a consistent and accurate relationship to the sensed condition regardless of variations in the supply fluid pressure.

It is an important object of the present invention to provide a relatively simple, reliable and accurate motion transmitting device having a controlling condition responsive portion and a controlled fluid pressure actuated output portion interconnected by a single fluid passage thereby permitting remote location of the condition responsive portion.

Other objects and advantages of the present invention will be apparent from the following description taken with the accompanying drawings wherein:

FIGURE 1 represents a schematic view of the present invention;
FIGURE 2 represents a sectional view taken on line 2—2 of FIGURE 1;
FIGURE 3 represents a schematic view of a modified form of the present invention;
FIGURE 4 represents a schematic view of an additional embodiment of the present invention;
FIGURE 5 represents a schematic view of another embodiment of the present invention.

Referring to FIGURE 1, numeral 20 designates a controlling condition sensitive portion which is shown as temperature actuated but which may be positioned in response to other conditions such as pressure, force, etc. through suitable modifications as will be recognized by those persons skilled in the art.

Numeral 22 designates a controlled fluid pressure actuated output portion which, in response to a fluid pressure $P_m$ controlled by condition sensitive portion 20, provides an output mechanical position for use in controlling indicating devices, a fuel valve in a fuel control device, or the like, none of which are illustrated in the drawings by virtue of the same being well known in the art.

The condition sensitive portion 20 includes a conventional temperature responsive probe 24 exposed to a desired variable temperature source T and which expands or contracts depending upon the relative change in sensed temperature T. A stem 26 connected to probe 24 and movable in response to expansion or contraction thereof is pivotally connected by pin 28 to a lever 30 which, in turn, is pivotally connected to a fixed support 32. A contoured valve 34 carried by the free end of lever 28 is positioned relative to an orifice 36 in flow controlling relationship with a conduit 38 leading from a source of fluid 40 at regulated pressure $P_R$ to a relative low pressure drain source $P_o$ and provided with a fixed area restriction 42 upstream from orifice 36. The conduit 38 is vented via orifice 36 to a relatively low pressure drain source $P_o$ such that for a given position of valve 34 relative to orifice 36 and thus a corresponding area of orifice 36 a fluid pressure $P_m$ intermediate restriction 42 and orifice 36 is generated which, in accordance with the contour impressed on valve 34, varies as a function of the sensed temperature T.

The controlled fluid pressure actuated output portion 22 includes a bellows 44 vented interiorly via passage 46 to pressure $P_m$ in conduit 38 intermediate restriction 42 and orifice 36. The one end of bellows 44 is anchored to a fixed support 48 and the opposite movable end thereof is provided with a stem 50 which bears against one arm 52 of a lever 54. The lever 54 is pivotally mounted on a fixed support 56 for movement about an axis A—A disposed at a right angle to the plane of FIGURE 1. A servo valve 58 secured to the free end of a second lever arm 60 of lever 54 and movable therewith cooperates with an orifice 62 at the discharge end of a passage 64 leading from a chamber 66 which receives fluid at regulated pressure $P_R$ from source 40 via a passage 68. A piston 70 slidably carried in chamber 66 divides the same into variable volume chambers 72 and 74 which communicate via a fluid restriction 76 fixedly secured in piston 70. The piston 70 has a fixed effective area ratio as a result of the effective area exposed to chamber 72 and the relatively smaller effective area exposed to chamber 74 established by stems 78 and 80 extending from opposite faces of piston 70 and through the respective ends of chamber 66. A variable pressure drop $P_R - P_x$ is generated across restriction 76 depending upon the position of servo valve 58 which controls the rate of flow out of chamber 72. The piston 70 will occupy a stationary position in response to a predetermined fixed pressure ratio $P_R/P_x$ established by a null position of servo valve 58 which predetermined pressure ratio $P_R/P_x$ is related to the fixed area ratio of piston 70 in accordance with the force balance relationship $P_R A_s = P_x A_L$ from which $$P_x = P_r \frac{A_s}{A_1}$$

wherein $A_s$ and $A_1$ denote the smaller and larger effective areas of piston 70 respectively. Since $P_r$ and $A_s/A_1$ may be assumed constant and the piston 70 is not required to overcome a spring or similar force generating mechanism, it is apparent that the piston 70 will be actuated in one direction or the other depending upon relative movement of the servo valve 58 from its null position and assume a fixed position when the required pressure $P_x$ is generated at the null position of valve 58.

A second bellows 82 vented interiorly to regulated pressure $P_R$ via passage 84 leading from passage 68 is anchored at one end to a fixed support 86. The opposite movable end 88 of bellows 82 carries a table member 90 fixedly secured thereto and provided with a knife edge track portion 92. The bellows 82 is surrounded by fluid at relatively low drain pressure $P_o$ and generates a force tending to urge table member 90 upward as viewed in FIGURE 1 depending upon the pressure differential $P_R - P_o$ acting across the effective area of end 88.

The lever 54 is provided with parallel spaced apart knife edge track portions 94 and 95 which extend parallel to track portion 92. Spaced apart roller members 96, 97 and 99 each having a circumferentially extending V-shaped notch 98 formed thereon are interposed between table 90 and lever 52 with the respective track portions 92, 94 and 95 operatively engaged with notches 98 of roller members 96, 97 and 99. The roller members 96, 97 and 99 are rotatably mounted on associated suitable antifriction bearings 100 carried by a pin 102 secured to spaced apart ends 103, 103' of a bifurcated link 104, the opposite end of which link is pivotally secured to stem 80 by a pin 106.

*Operation of FIGURE 1*

It will be assumed that the lever 30 and attached valve 34 occupy a given position in response to the probe 24 as a result of a stable temperature T. The area of orifice 36 established by the contour of valve 34 for the given position of the latter permits fluid to escape from conduit 38 to drain pressure $P_o$ thereby establishing a corresponding pressure $P_m$ downstream from fixed restriction 42 which pressure $P_m$ is vented to the interior of bellows 44. The fluid at regulated pressure $P_r$ is vented to bellows 82.

The torque balance on lever 54 may be defined as (1) $\quad A_{44}l_1(P_m - P_o) = A_{82}l_2(P_R - P_o) + A_{62}l_3(P_x - P_o)$ wherein $P_m - P_o$ represents the pressure differential across the bellows 44, $A_{44}$ the effective area of bellows 44 against which the $P_m - P_o$ differential acts, $l_1$ the effective lever arm of lever 54 through which the bellows 44 acts, $P_R - P_o$ the pressure differential across the bellows 82, $A_{82}$ the effective area of bellows 82 across which the $P_R - P_o$ differential acts, $l_2$ the effective lever arm of lever 54 through which the bellows 82 acts via roller 98, $P_x - P_o$ the pressure differential across orifice 62 controlled by servo valve 58, $A_{62}$ the effective flow area of orifice 62 and $l_3$ the effective lever arm of lever 54 from the center of orifice 62 to the axis A—A.

The fluid flow through conduit 38 may be defined as (2) $\quad C_{42}A_{42}\sqrt{P_R - P_m} = C_{36}A_{36}\sqrt{P_m - P_o}$ wherein $C_{42}$ and $C_{36}$, respectively, represent the product of the well known flow coefficient of discharge and square root of the specific gravity of the fluid flowing through restriction 42 and orifice 36, respectively, $A_{42}$ the effective bow area of restriction 42, $P_R - P_m$ the pressure differential across restriction 42, $A_{36}$ the effective flow area of orifice 36 and $P_m - P_o$ the pressure differential across orifice 36.

The fluid flow through restriction 76 of piston 70 may be defined as (3) $\quad C_{76}A_{76}\sqrt{P_R - P_x} = C_{62}A_{62}\sqrt{P_x - P_o}$ wherein $C_{76}$ and $C_{62}$ are the heretofore mentioned products of coefficient of discharge and square root of specific gravity associated with restriction 76 and orifice 62, respectively, $A_{76}$ the effective area of restriction 76, $P_R - P_x$ the pressure differential across restriction 76, $A_{62}$ the effective area of orifice and $P_x - P_o$ the pressure differential across orifice 62.

From Equations 2 and 3 above, the following relationships are obtained:

(4) $\quad P_m - P_o = P_R - P_o / 1 + \left(\dfrac{C_{36}A_{36}}{C_{42}A_{42}}\right)^2$ (5) $\quad P_x - P_o = P_R - P_o / 1 + \left(\dfrac{C_{62}A_{62}}{C_{76}A_{76}}\right)^2$ By substitution, the quantities of Equations 4 and 5 may be inserted in Equation 1 above from which the output travel of piston 70, $l_2$, may be solved as follows:

(6)

$$l_2 = \frac{A_{44}}{A_{82}}l_1\left[\frac{1}{1+\left(\dfrac{C_{36}A_{36}}{C_{42}A_{42}}\right)^2}\right] - \frac{A_{62}}{A_{82}}l_3\left[\frac{1}{1+\left(\dfrac{C_{62}A_{62}}{C_{76}A_{76}}\right)^2}\right]$$

Since the effective areas of orifice 62 at the null position of servo valve 58 and restriction 76 are constant and the area of bellows 82 as well as lever arm $l_3$ are constant, the term $$\frac{A_{62}}{A_{82}}l_3\left[\frac{1}{1+\left(\dfrac{C_{62}A_{62}}{C_{76}A_{76}}\right)^2}\right]$$

is a constant. Also, the area, $A_{62}$, of orifice 62 is small in comparison to the areas $A_{44}$ and $A_{82}$ of bellows 44 and 82 so that the term $$\frac{A_{62}}{A_{82}}l_3\left[\frac{1}{1+\left(\dfrac{C_{62}A_{62}}{C_{76}A_{76}}\right)^2}\right]$$

becomes sufficiently small to be neglected whereupon Equation 6 may be reduced to:

(7) $\quad l_2 = \dfrac{A_{44}}{A_{82}}l_1\left[\dfrac{1}{1+\left(\dfrac{C_{36}A_{36}}{C_{42}A_{42}}\right)^2}\right]$ It will be understood that $C_{36}/C_{42}$ will remain a constant value assuming the restriction 42 and orifice 36 are subjected to the same temperature of the fluid passing therethrough. Various arrangements may be used to ensure that the restriction 42 and orifice are maintained at the same temperature which may include placing the restriction 42 and orifice 36 in the remote location of the condition sensitive portion 20 where the temperature environment would maintain the restriction 42 and orifice 36 as well as the fluid passing therebetween at the same temperature, maintain fluid flow through conduit 38 at a sufficient level so that heat transfer characteristics are sufficient to reduce any temperature differential between restriction 42 and orifice 36 to a minimum, or insulate conduit 38 between restriction 42 and orifice 36.

From Equation 7 above it will be observed that the only independent variable is $A_{36}$ which renders the output travel of piston 70 a function of $A_{36}$ only. The quantity $P_R - P_o$ does not appear in Equation 7 which indicates that the output travel of piston 70 is independent of the pressure differential $P_R - P_o$ and thus unaffected by variations in the supply fluid pressure $P_R$.

It will be understood that the fluid pressure $P_m$ will increase or decrease depending upon the relative change in temperature T and corresponding area of orifice 36 established by the position of valve 34. The change in pressure $P_m$ acting through bellows 44 creates a torque unbalance on lever 54 which, in turn, actuates servo valve 58 relative to orifice 62 thereby modifying pressure $P_x$ and thus the $P_R/P_x$ pressure ratio across piston 70 accordingly. The piston 70 moves in response to the change in pressure $P_x$ and displaces roller 98 which, in turn, varies the effective length $l_2$ of lever arm 52 thereby increasing or decreasing, depending upon the relative direction of movement of piston 70, the torque derived from the pressure $P_R$ loaded bellows 82 acting through roller 98 against lever 52 through lever arm $l_2$. Upon reaching a torque balance on lever 52 as heretofore mentioned, the servo valve 58 is nulled and pressure $P_x$ stabilized accordingly thereby establishing the required $P_R/P_x$ pressure ratio which stabilizes piston 70.

FIGURE 3

Referring to FIGURE 3 and the modified form of applicants' invention shown therein, structure similar to that of FIGURE 1 is identified by like numerals. Numeral 108 designates a contoured valve member which coacts with orifice 42 to vary the effective flow area thereof. The valve 108 may be actuated by a second condition sensitive device similar to temperature responsive probe 24 and responsive to a second variable temperature source, $T_1$, or any other suitable actuating means responsive to a variable input condition such as a pressure, force or the like. The table member 90 is loaded by a lever 110 having one end secured to table member 90 and the opposite end pivotally secured to a fixed support 112 by a pin 114. The axis B—B about which lever 110 pivots is perpendicular to axis A—A. The movable end of bellows 82 bears against lever 110 in opposition to a bellows 116 vented interiorly to conduit 38 at pressure $P_m$, intermediate restriction 42 and orifice 36 via a passage 84. Bellows 116 is anchored at one end to a fixed support 120. Preferably the effective end areas of bellows 82 and 116 exposed to the respective pressures $P_R$ and $P_m$ are equal.

Operation of FIGURE 3

Assuming valves 34 and 108 to occupy given positions in response to stable temperatures T and $T_1$, respectively, the effective flow areas of orifices 42 and 36 are fixed accordingly and a corresponding pressure $P_m$ generated in conduit 38.

The torque balance on lever 52 may be defined by:

(8) $A_{44}l_1(P_m-P_o)=A_{62}l_3(P_x-P_o)$
$+l_2C[A_{82}(P_R-P_o)-A_{116}(P_m-P_o)]$ wherein $A_{116}$ represents the effective area of bellows 116 against which the $P_m-P_o$ pressure differential acts, C is a constant representing the lever arm ratio $l_4/l_5$ of lever 110 through which the force derived from bellows 82 and 116 acts against roller 98 and the remaining terms defined as above in regard to FIGURE 1. Since the quantity $A_{62}l_3(P_x-P_o)$ contributes a relatively small force, it may be eliminated for practical purposes from Equation 8 which then provides a close approximation of the force balance. Furthermore, since $A_{82}$ and $A_{116}$ are equal areas, Equation 8 may be reduced to:

(9) $A_{44}l_1(P_m-P_o)=l_2CA_{82}$ or 116 $(P_R-P_m)$

The flow through conduit 38 may be determined by:

(10) $P_R-P_m=\left(C_1\dfrac{A_{36}}{A_{42}}\right)^2(P_m-P_o)$ wherein $P_R-P_m$ represents the pressure drop across restriction 42, $C_1$ a constant representing the aforementioned constant $C_{36}/C_{42}$ or products of coefficient of discharge and square root of specific quantity.

By substitution, the right hand side of Equation 10 may be inserted for $(P_R-P_m)$ in Equation 9 which reduces to:

(11) $l_2=\dfrac{A_{44}}{A_{82 \text{ or } 116}}l_1\dfrac{C_1^2}{C}\dfrac{A_{42}^2}{A_{36}^2}=\dfrac{A_{44}}{A_{82 \text{ or } 116}}l_1C_3\dfrac{A_{42}^2}{A_{36}^2}$ from which it will be noted that the only variables are $A_{42}$ and $A_{36}$ such that the travel of piston 70, $l_2$, is proportional to $A_{42}$, the area of restriction 42, and inversely proportional to $A_{36}$, the area of orifice 36. As in the case of FIGURE 1 heretofore mentioned, the travel of piston 70 is independent of the supply fluid regulated pressure, $P_R$, and not affected by variations thereof.

Similar to FIGURE 1 heretofore described, a change in temperature T modifies pressure $P_m$ acting against bellows 44 causing servo valve 58 to be upset from its null position whereupon piston 70 and attached roller 98 move accordingly in response to the change in pressure $P_x$. The roller 98 follows track portion 92 which is parallel to the pivotal axis B—B of lever 110 and follows track portion 94 which is perpendicular to the pivotal axis A—A of lever 54. Thus, the movement of roller 98 has no effect on the torque output of lever 110 which remains constant but such movement of roller 98 does change the effective lever arm $l_2$ of lever 52 through which roller 98 acts in opposition to the torque output of bellows 44 acting through lever arm $l_1$ of lever 54. As the lever arm $l_2$ increases or decreases depending upon the relative movement of roller 98, a torque balance on lever 54 is reached whereupon the servo valve 58 is stabilized establishing the necessary pressure $P_x$ and thus pressure ratio $P_R/P_x$ which stabilizes piston 70.

Referring to FIGURE 4 and the modified form of applicants' invention shown therein, it will be noted that structure similar to that of FIGURE 1 is identified by like numerals. The embodiment of FIGURE 4 includes a second roller member assembly 122 similar to roller members 96, 97 and 99 heretofore described and the structure thereof is identified by like numerals primed. The roller member assembly 122 is interposed between lever 54 and bellows 82 by means of which a sensed second variable condition representing an input signal may be introduced to control piston 70. The position of piston 70 then becomes a function of the sensed temperature, T, as well as a function of the second variable condition which may be a temperature, pressure, control lever position or any other suitable variable condition.

The roller assembly 122 includes spaced apart rollers 96', 97' and 99' each mounted on an associated antifriction bearing 100' carried by pin 102 which, in turn, is secured to spaced apart ends 124 and 126 of a bifurcated link 128. The link 128 is actuated by conventional actuating means, not shown, responsive to the sensed second variable condition. The roller members 96' and 99' are each provided with an associated V-shaped notch 98' which are engaged by knife edge track portions 94 and 95 of lever 54. The notch 98' of roller member 97' is engaged by knife edge track portion 92 of table member 90. A second set of spaced apart knife edge track portions 94', 95' similar to 94, 95, only one of which is shown, formed on lever 54 engage notches 98 of roller members 96 and 99 interposed between lever 54 and a table member 130 fixedly secured to the movable end of bellows 44. The table member 130 is provided with a knife edge track portion 132 which engages notch 98 of roller member 97.

Operation of FIGURE 4

Assuming fixed positions of roller members 96, 97, 99 and 96', 97' and 99' in response to given values of sensed temperature, T, and sensed second variable condition, respectively, the torque balance on lever 54 may be defined by:

(12) $A_{44}l_5(P_m-P_o)=A_{82}l_4(P_r-P_o)+A_{62}l_3(P_x-P_o)$ wherein $A_{44}$, $P_m-P_o$, $A_{82}$, $P_R-P_o$, $A_{62}$, $l_3$ and $P_x-P_o$ are defined as set forth in Equation 1 above. The remaining variables $l_4$ and $l_5$ are the effective lever arms of lever 54 through which the bellows 44 and 82 act via roller members 96, 97, 99 and 96', 97', and 99' respectively. By substitution of Equations 4 and 5 in Equation 12 the following relationship is obtained:

(14)
$$A_{44}l_4 \frac{P_R-P_o}{1+\left(\frac{C_{36}A_{36}}{C_{42}A_{42}}\right)^2} = A_{82}l_5(P_R-P_o) + A_{62}l_3 \frac{P_R-P_o}{1+\left(\frac{C_{62}A_{62}}{C_{76}A_{76}}\right)^2}$$

which reduces to:

(15)
$$A_{44}l_4 / 1+\left(\frac{C_{36}A_{36}}{C_{42}A_{42}}\right)^2 = A_{82}l_5 + A_{62}l_3 / 1+\left(\frac{C_{62}A_{62}}{C_{76}A_{76}}\right)^2$$

from which the travel of piston 70, $l_5$, may be obtained.

(16)
$$l_5 = \frac{A_{44}}{A_{82}}l_4\left[\frac{1}{1+\left(\frac{C_{36}A_{36}}{C_{42}A_{42}}\right)^2}\right] - \frac{A_{62}}{A_{82}}l_3\left[\frac{1}{1+\left(\frac{C_{62}A_{62}}{C_{76}A_{76}}\right)^2}\right]$$

As in the case of Equations 6 and 7 above, the term $$\frac{A_{62}}{A_{82}}l_3\left[\frac{1}{1+\left(\frac{C_{62}A_{62}}{C_{76}A_{76}}\right)^2}\right]$$

may be neglected, reducing Equation 16 to

(17)
$$l_5 = \frac{A_{44}}{A_{82}}l_4\left[\frac{1}{1+\left(\frac{C_{36}A_{36}}{C_{42}A_{42}}\right)^2}\right]$$

The areas $A_{44}$ and $A_{82}$ of bellows 44 and 82, respectively, are constant as is the area of restriction 42 and $C_{36}/C_{42}$ for the reason heretofore mentioned in regard to Equation 7 which renders the travel of piston 70, $l_5$, a function of the variable lever arm, $l_4$, which is dependent upon the sensed second condition and a function of the variable area of orifice 36 which is dependent upon the sensed temperature T only. The quantity $P_R-P_o$ does not appear in Equation 17 which indicates that the output travel of piston 70 is independent of the pressure differential $P_R-P_o$ and thus unaffected by variations in the supply fluid pressure $P_R$.

Referring to FIGURE 5, it will be noted that structure similar to that of FIGURE 1 is identified by like numerals. As in the case of FIGURE 4, a second roller assembly 122 is provided which is actuated in response to the sensed second condition of operation. The bellows 82 is vented to passage 84 intermediate a fixed area restriction 134 and a variable area orifice 136 in series flow relationship. A condition sensitive portion similar to 20 of FIGURE 1 includes a contoured valve 138 which coacts with orifice 136 to vary the area thereof in response to a sensed third variable condition such as temperature $T_1$ or any other suitable variable condition. The position of piston 70 thus becomes a function of temperature T by virtue of the control function provided by valve 34, a function of temperature $T_1$ by virtue of valve 138 and a function of the sensed second condition by virtue of roller assembly 122.

The roller assembly 122 is interposed between lever 54 and table member 140 with knife edge track portions 94', 95' of lever 54 and 132 of table member 140 riding in the respective notches 98' of roller members 96', 97' and 99'. The roller members 96, 97 and 99 are interposed between lever 54 and table member 90 with knife edge track portions 94 and 95 of lever 54 and 92 of table member 90 riding in the respective notches 98 of roller members 96, 97 and 99.

It will be noted that the lever 54 is loaded by a counter clockwise torque tending to close valve 58 which torque varies in accordance with the force derived from the pressure differential $P_m-P_o$ across bellows 44 as well as the effective lever arm of lever 54 established by the position of roller members 96', 97' and 99' relative to the pivot axis of lever 54. The counter clockwise torque is opposed by a clockwise torque derived from the force generated by the pressure differential $P_R'-P_o$ acting across bellows 82 as well as the effective lever arm established by the position of roller members 96, 97 and 99 relative to the pivot axis of lever 54. A balanced condition of lever 54 is defined by:

(18) $\quad A_{44}l_5(P_m-P_o) = A_{82}l_4(P_R'-P_o) + A_{62}l_3(P_x-P_o)$ wherein the terms $A_{44}$, $l_5$, $P_m-P_o$, $A_{82}$, $l_4$, $A_{62}$, $l_3$, $P_x-P_o$ are as defined heretofore and $P_R'-P_o$ is the pressure differential across bellows 82. From Equation 18, neglecting $A_{62}l_3$ $(P_x-P_o)$ which is a relatively small value, the relationship $$l_4 = \frac{A_{44}}{A_{82}}l_5\left(\frac{P_m-P_o}{P_R'-P_o}\right)$$

is obtained wherein $l_4$ is representative of the piston 70 travel. From Equation 4

$$P_m-P_o = \frac{P_R-P_o}{1+\left(\frac{C_{36}A_{36}}{C_{42}A_{42}}\right)^2}$$

Likewise

(19) $\quad P_R'-P_o = \dfrac{P_R-P_o}{1+\left(\dfrac{C_{136}A_{136}}{C_{134}A_{134}}\right)^2}$ wherein $C_{136}$ and $C_{134}$ represent the product of the coefficient of discharge and square root of the specific gravity of the fluid flowing through orifice 136 and restriction 134, respectively. By substitution of Equations 4 and 19 in Equation 18 the travel of piston 70, $l_4$, is defined as

(20)
$$l_4 = \frac{A_{44}}{A_{82}}l_5\frac{1+\left(\frac{C_{136}A_{136}}{C_{134}A_{134}}\right)^2}{1+\left(\frac{C_{36}A_{36}}{C_{42}A_{42}}\right)^2}$$

Assuming that restrictions 134 and orifice 136 as well as restriction 42 and orifice 36 are maintained at the same temperature in the manner heretofore mentioned in regard to FIGURE 1 the terms $C_{136}/C_{134}$ and $C_{36}/C_{42}$ become constant. Also the bellows 44 and 82 have constant areas so that $A_{44}/A_{82}$ is constant. The areas of restrictions 134 and 42, $A_{134}$ and $A_{42}$, represent constants which, in turn, renders $l_4$ a function of the only remaining variables $l_5$, $A_{136}$ and $A_{36}$ which correspond to the sensed second variable condition, temperatures $T_1$ and T, respectively. As in the case of FIGURES 1, 3 and 4, the travel of piston 70 of FIGURE 5 is not affected by changes in the supply pressure $P_R$.

Various modifications and changes in the above preferred embodiments of the present invention may be made by those persons skilled in the appropriate art without departing from the scope of the present invention as defined by the following claims.

We claim:
1. Motion transmitting mechanism comprising:
   a source of pressurized fluid;
   a first conduit connecting said source with a relatively lower pressure fluid source;
   first and second restrictions in series flow relationship in said first conduit for controlling fluid flow therethrough;
   first valve means operatively connected to said second restriction for varying the flow area of said second restriction and thus the fluid pressure in said first conduit intermediate said first and second restrictions;
   condition responsive means operatively connected to said first valve means for actuating the same;
   a second conduit connecting said source of pressurized fluid with said relatively lower pressure fluid source;
   third and fourth restrictions in series flow relationship in said second conduit for controlling fluid flow therethrough;

second valve means operatively connected to said fourth restriction downstream from said third restriction for varying the flow area of said fourth restriction and thus the fluid pressure drop across said third restriction;

first fluid pressure responsive means responsive to the fluid pressure drop across said third restriction for producing an output position signal;

pivotally mounted lever means operatively connected to said second valve means for actuating the same;

second fluid pressure responsive means operatively connected to said first conduit intermediate said first and second restrictions, said source of relatively lower pressure fluid and said lever means and adapted to impose a force on said lever means in response to the fluid pressure drop across said second restriction;

third fluid pressure responsive means operatively connected to said source of pressurized fluid and said source of relatively lower pressure fluid for producing a force in response to the fluid pressure differential between said pressurized fluid and said relatively lower pressure fluid; and movable force transmitting means operatively connected to said lever means and one of said second and third fluid pressure responsive means for transmitting the force generated by said one fluid pressure responsive means to said lever means in opposition to said second fluid pressure responsive means;

said force transmitting means being operatively connected to and movable with said first fluid pressure responsive means to thereby vary the effective lever arm of said lever means through which said force transmitting means acts in opposition to said second fluid pressure responsive means to provide a torque balance on said lever means;

said first fluid pressure responsive means having a predetermined position in response to a given fluid pressure derived from said first conduit intermediate said first and second restrictions irrespective of variations in pressure of said source of pressurized fluid.

2. Motion transmitting mechanism as claimed in claim 1 wherein:
said lever means is mounted for pivotal movement about an axis perpendicular to the direction of movement of said force transmitting means.

3. Motion transmitting mechanism as claimed in claim 2 wherein:
said lever means is provided with a track portion extending perpendicular to said pivot axis;
said third fluid pressure responsive means is a bellows member provided with a diametrically extending track portion on a movable end thereof; and
said force transmitting means includes a roller ridable on said track portions of said lever means and said third fluid pressure responsive means.

4. Motion transmitting mechanism as claimed in claim 1 wherein:
said first restriction in said first conduit is a fixed area restriction and the fluid pressure in said first conduit intermediate said first and second restrictions is variable as a function of the flow area of said second restriction.

5. Motion transmitting mechanism as claimed in claim 1 wherein:
said third fluid pressure responsive means includes a first bellows vented to said source of pressurized fluid and said relatively lower pressure source and responsive to the fluid pressure differential therebetween;
said third fluid pressure responsive means further includes a second bellows vented to said first conduit intermediate said first and second restrictions and said source of relatively lower pressure fluid and responsive to the fluid pressure differential therebetween;
said first and second bellows arranged in force opposing relationship; and
said force transmitting means including a lever member pivotally mounted on said axis parallel to the direction of movement of said force transmitting means along said lever means and operatively connected to said first and second bellows.

6. Motion transmitting mechanism as claimed in claim 3 and further including:
third valve means operatively connected to said first restriction in said first conduit for varying the flow area thereof; and
second condition responsive means operatively connected to said third valve means for actuating the same;
said fluid pressure intermediate said first and second restrictions varying as a function of the area of said first or second restrictions established by said first or third valve means in response to the associated condition response means.

7. Motion transmitting mechanism as claimed in claim 1 and further including:
second movable force transmitting means operatively connected to said lever means and the other of said second and third fluid pressure responsive means for transmitting the force generated by said other fluid pressure responsive means in opposition to said one fluid pressure responsive means; and
second condition responsive means operatively connected to said second movable force transmitting means for actuating the same.

8. Motion transmitting mechanism as claimed in claim 7 and further including:
a third conduit connecting said source of pressurized fluid with said relatively lower pressure fluid source;
fifth and sixth restrictions in series flow relationship in said third conduit;
third valve means operatively connected to said sixth restriction for varying the flow area of said sixth restriction and thus the fluid pressure intermediate said fifth and sixth restrictions; and
third condition responsive means operatively connected to said third valve means for actuating the same;
said third fluid pressure responsive means having a fluid connection with said third conduit intermediate said fifth and sixth restrictions and responsive to the fluid pressure therein.

9. Motion transmitting mechanism as claimed in claim 7 wherein:
said first movable force transmitting means is a roller assembly operatively connected to and actuated by said first fluid pressure responsive means;
said second movable force transmitting means is a roller assembly operatively connected to and actuated by said second condition responsive means.

10. Motion transmitting mechanism as claimed in claim 9 wherein said roller assemblies for said first and second movable force transmitting means are movable along said lever means at a right angle to the pivot axis of said lever means.

References Cited

UNITED STATES PATENTS

| | | | |
|---|---|---|---|
| 2,980,069 | 4/1961 | Hilker et al. | 91—47 |
| 3,087,469 | 4/1963 | Evans | 91—385 |
| 3,171,330 | 3/1965 | McCombs | 91—385 |
| 3,232,179 | 2/1966 | McCombs | 91—386 |

PAUL E. MASLOUSKY, *Primary Examiner.*